(12) United States Patent
Monteil et al.

(10) Patent No.: US 11,222,271 B2
(45) Date of Patent: Jan. 11, 2022

(54) VEHICULAR DRIVING ACTIONS IN THE PRESENCE OF NON-RECURRENT EVENTS

(71) Applicant: INTERNATIONAL BUSINESS MACHINES CORPORATION, Armonk, NY (US)

(72) Inventors: Julien Monteil, Dublin (IE); Anton Dekusar, Castleknock (IE); Yassine Lassoued, Dublin (IE); Rodrigo H. Ordonez-Hurtado, Maynooth (IE); Giovanni Russo, Dublin (IE); Martin Mevissen, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 938 days.

(21) Appl. No.: 15/956,955

(22) Filed: Apr. 19, 2018

(65) Prior Publication Data

US 2019/0325325 A1    Oct. 24, 2019

(51) Int. Cl.
*G06N 5/04*    (2006.01)
*G06N 20/00*    (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS

| 9,171,462 | B2 | 10/2015 | Hampapur et al. |
| 2014/0222321 | A1 | 8/2014 | Petty et al. |
| 2015/0206427 | A1 | 7/2015 | Blandin et al. |
| 2016/0171887 | A1 | 6/2016 | Blandin et al. |
| 2017/0359197 | A1 | 12/2017 | Stolfus |

OTHER PUBLICATIONS

Sun, et al., DxNAT—Deep Neural Networks for Explaining Non-Recurring Traffic Congestion, arXiv:1802.00002v1 [cs.LG] Jan. 30, 2018, 2018, pp. 1-10 (Year: 2018).*

List, et al., Quantifying Non-Recurring Delay on New York City's Arterial Highways, Project C-01-29, Final Report, New York State Department of Transportation, Region 11, 2008, pp. 1-321 (Year: 2008).*

Chung et al., "Quantifying non-recurrent traffic congestion caused by freeway work zones using archived work zone and ITS traffic data," TRANSPORMETRICA, vol. 8, No. 4, 2012 (16 pages).

* cited by examiner

*Primary Examiner* — Wilbert L Starks
(74) *Attorney, Agent, or Firm* — Griffiths & Seaton PLLC (57) ABSTRACT

Embodiments for planning vehicular driving actions in the presence of non-recurrent events by a processor. One or more dynamics of non-recurrent events in a transport network may be learned according to one or more contextual factors. One or more vehicle-specific factors may be learned in relation to a historical journey and current journey of a vehicle. One or more action responses associated with the one or more non-recurrent events and the one or more vehicle-specific factors may be generated.

17 Claims, 8 Drawing Sheets

VEHICULAR DRIVING ACTIONS IN THE PRESENCE OF NON-RECURRENT EVENTS

BACKGROUND OF THE INVENTION

Field of the Invention

The present invention relates in general to computing systems, and more particularly, to various embodiments for planning vehicular driving actions in the presence of non-recurrent events by a processor.

Description of the Related Art

Vehicles of every kind, size, and energy consumption are prevalent in every aspect of today's society, as people are more mobile today than likely at any time in recorded history. For example, millions of cars, trucks, trains, and other land vehicles run on the U.S. roadways at any moment. Attendant with the proliferation of vehicles have been increased traffic congestion and events that negatively impact traffic and/or increase problematic traffic. It is a constant necessity to improve the safety on roads, prevent accidents, and to learn. As one of ordinary skill in the art will appreciate, conventional aids enabling a driver to reduce the operational risk are limited in some cases, for example, to only externally-mounted side view mirrors and an internally-mounted rear view mirror. The challenges of preventing and reducing risks include a driver not being aware of their driving habits and driving habits of others along with various other environmental conditions.

SUMMARY OF THE INVENTION

Various embodiments for planning vehicular driving actions in the presence of non-recurrent events by a processor are provided. In one embodiment, by way of example only, a method for cognitively propagating and learning dynamics of non-recurrent events in a transport network by a processor is provided. One or more dynamics of non-recurrent events in a transport network may be learned according to one or more contextual factors. One or more vehicle-specific factors may be learned in relation to a historical journey and current journey of a vehicle. One or more action responses associated with the one or more non-recurrent events and the one or more vehicle-specific factors may be generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment. The prolific increase in use of IoT appliances in computing systems, particularly within the cloud computing environment, in a variety of settings provide various beneficial uses to a user. Various IoT appliances may be used for personal use, such as travel, while also using the IoT appliances within various types of vehicles or navigation systems for travel.

It is a constant necessity to improve the safety on roads while increasing the use-efficiency of a transport network. As aforementioned, attendant with the proliferation of vehicles have been increased driving risks associated with a variety of non-recurrent events. For example, non-recurrent congestion events, such as unexpected traffic incidents account for nearly 50% of delays. Examples of non-recurrent events may include, for example, traffic incidents and accidents, adverse weather conditions, traffic congestion, temporary road closures, non-traffic related events (e.g., parades, protests, etc.). Because of their non-recurrent properties, it is hard to predict the future state of the network through standard statistical analyses once an event occurs. More specifically, statistical models may fail to predict traffic conditions in the case of non-recurrent events even in real-time. Thus, a need exists for planning vehicular driving actions in the presence of non-recurrent events.

Accordingly, various embodiments provide an IoT computing framework whereby the location, severity (and possibly duration) of events may be pushed to a cloud computing environment by one or more vehicles and then become accessible to alternative users. Such knowledge of the impacted transport network links can be used as input to improve routing services.

In one aspect, the present invention provides for an IoT computing network to predict and detect (in-real time) traffic conditions for both recurrent and non-recurrent events. The detected recurrent and/or non-recurrent events may be communicated to one or more vehicles or uses of the IoT network. The propagation of such events in time and space, along with a planned and/or predicted route of one or more users, may be performed via a mobile agent. In one aspect, a user may be an operator of a vehicle such as, vehicle operators of passenger cars or a fleet of vehicles (e.g., public transport, logistics fleet, etc.). In one aspect, depending on one or more preferences of a user or entity (e.g., government entity, corporate entity, organization), one or more driving actions may be determined and suggested in time (e.g., change a departure time, adding stopover, adjusting speed, etc.) and space (rerouting of a route).

In one embodiment, one or more non-recurrent events in a transport network may be learned according to one or more contextual factors. One or more action responses associated with the one or more non-recurrent events may be generated.

In one aspect, the mechanisms of the present invention cognitively learn one or more non-recurrent events based on: (1) detecting sensor data from one or more sensors relating to vehicles, traffic sensors, IoT devices (e.g., mobile devices, smartphones, computers, laptops, drones, cameras, etc.); (2) receiving vehicular collaboration data received from other vehicles via "vehicle-to-vehicle" ('V2V') communication and/or external data sources (e.g., drones, moving cameras); (3) receiving real-time data from one or more IoT devices, and/or (4) receiving data from one or more data sources (e.g., weather data, traffic data, emergency management information, road conditions data, event data such as a parade or festival on a road of a transport network, and/or political data such as information relating to a protest occurring or impacting the transport network).

In one aspect, specific parameters or "contextual factors" may be dynamically learned via one or more machine learning operations. Furthermore, contextual factors may be in a specific context related to the transport network. The contextual factors may also include, for example, a static transport network, location of one or more events (e.g., non-recurrent events), a degree of intensity of the one or more events that impact the transport network, one or more traffic conditions, traffic predictions, loss time of one or more users of the transport network as a result of the one or more events, a total time of driving by one or more users, predicted routes associated with the one or more users of the transport network, current routes associated with the one or more users of the transport network, traffic data, weather data, road conditions, travel itinerary of the one or more users, weather data, road conditions, route trajectories in relation to a vehicle, or a combination thereof.

The vehicular collaboration data may be retrieved from a vehicular collaboration system capturing one or more angles, views, longitudinal positions, latitudinal positions, sensor data, and/or other dimensions of the vehicle for other vehicles by using, for example, one or more cameras and/or sensor-based devices of nearby, neighboring cars. The vehicular collaboration system may include using collaborative images, video, sounds, or other sensor-based device data through sharing of information. The collaborative data may be combined to form a 360-degree view of the vehicle capable of being displayed such as, for example, in a display system of the vehicle.

The so-called "route" may be very subjective and context dependent. A route may simply be, in a broadest possible meaning, the entire/whole travel experience from a point A to a point B. For example, a route may encompass an entire travel experience. In a more limiting context, a route may include one or more actions or movements of traveling from one location to another location. The route may also include one or more acts, events, decisions, or travel related operations relating to one or more acts of moving from one location to one or more alternative locations. A route may include each decision, experience, action, and/or movement within and without a vehicle. A route may include one or more routes and destinations. A route may also include one or more actions, movements, stops (temporary or permanent), travel information, reservations, transportation options, modes of travel, and/or one or more operations relating to navigation systems, entertainment systems, and/ or telecommunication systems. In one aspect, a route may be a user defined location-to-location (point-to-point) journey and/or may be use of single or multi-modal travel planning. Also, the route may be a single or multi-modal travel planning learned via cognitive reasoning and/or artificial intelligence.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
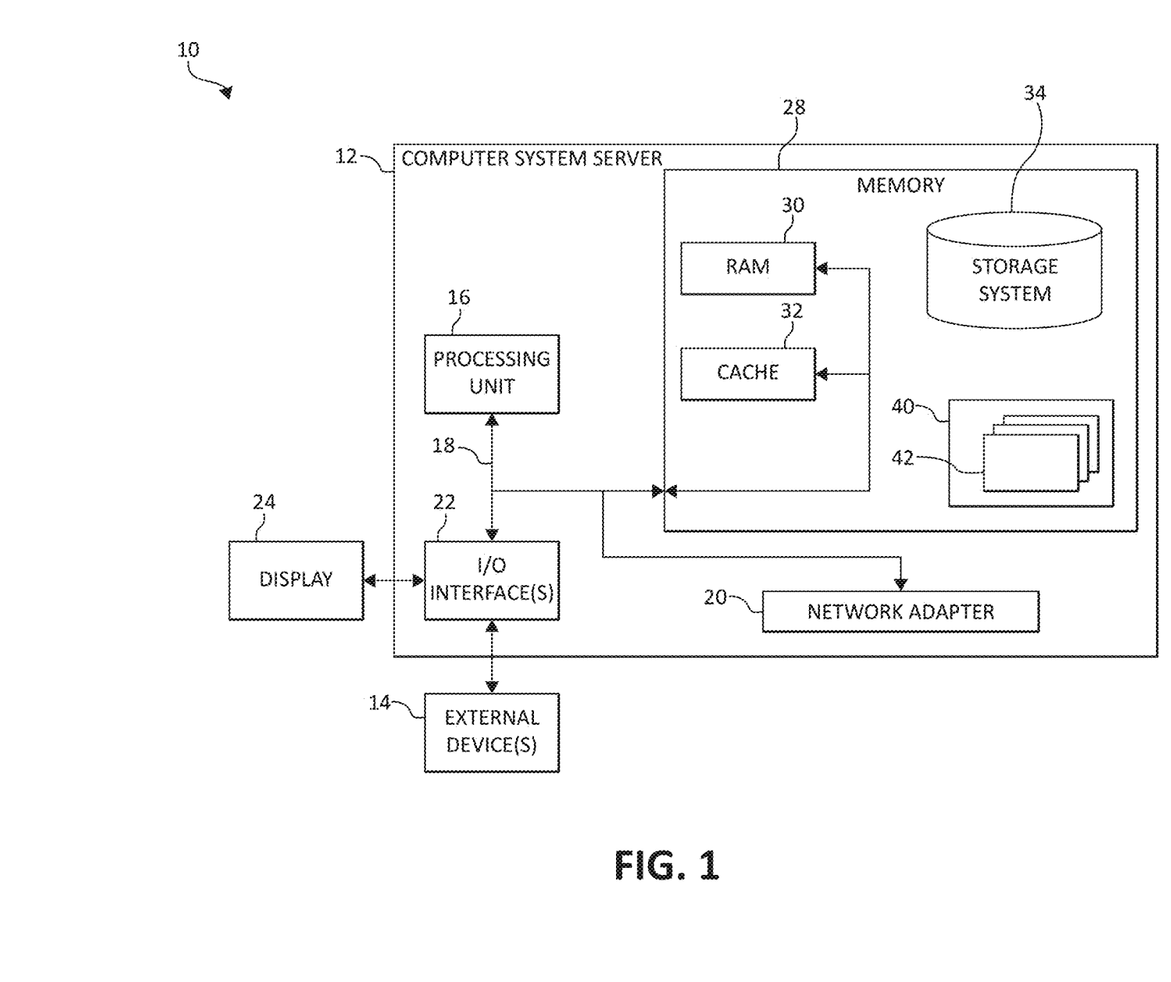
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
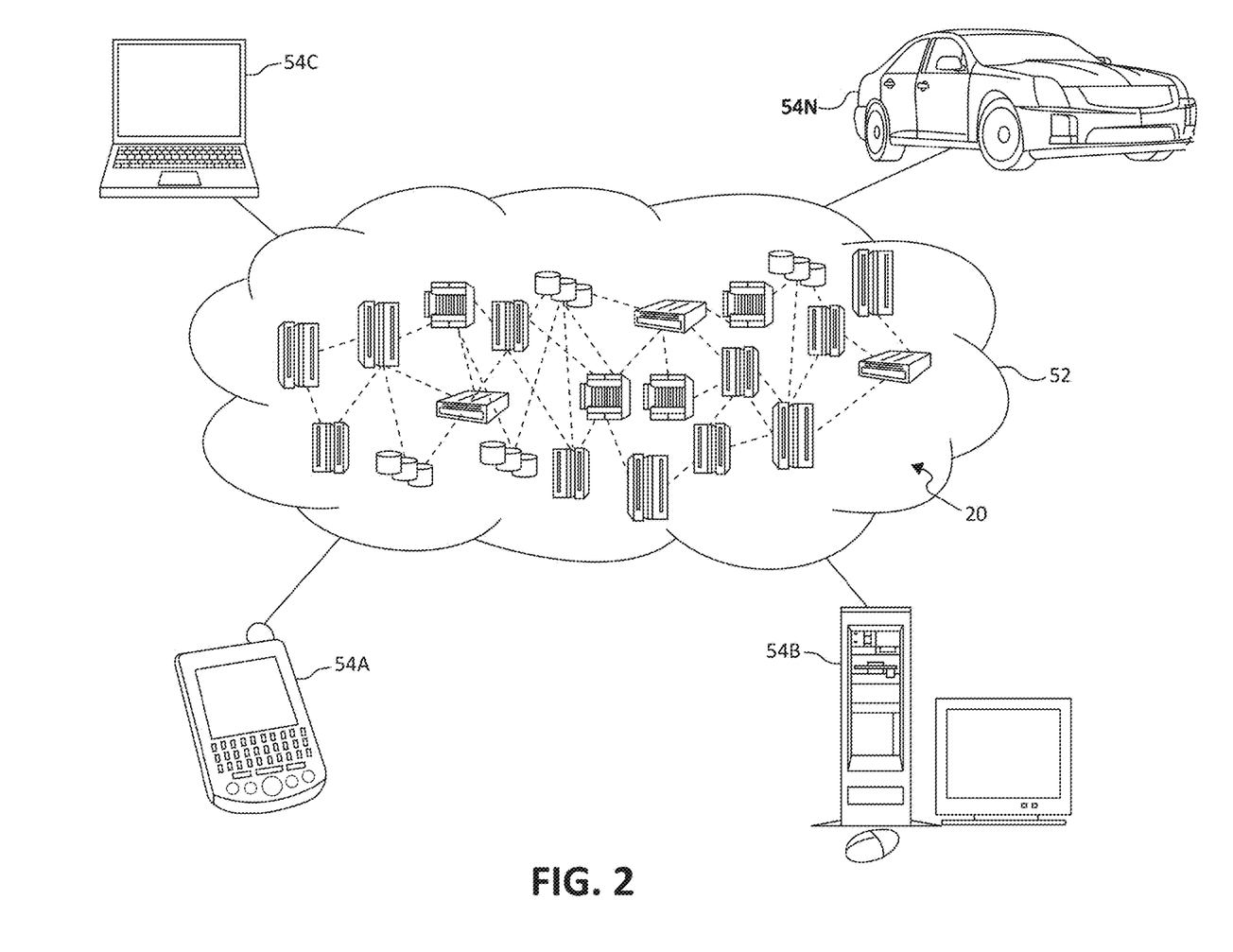
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
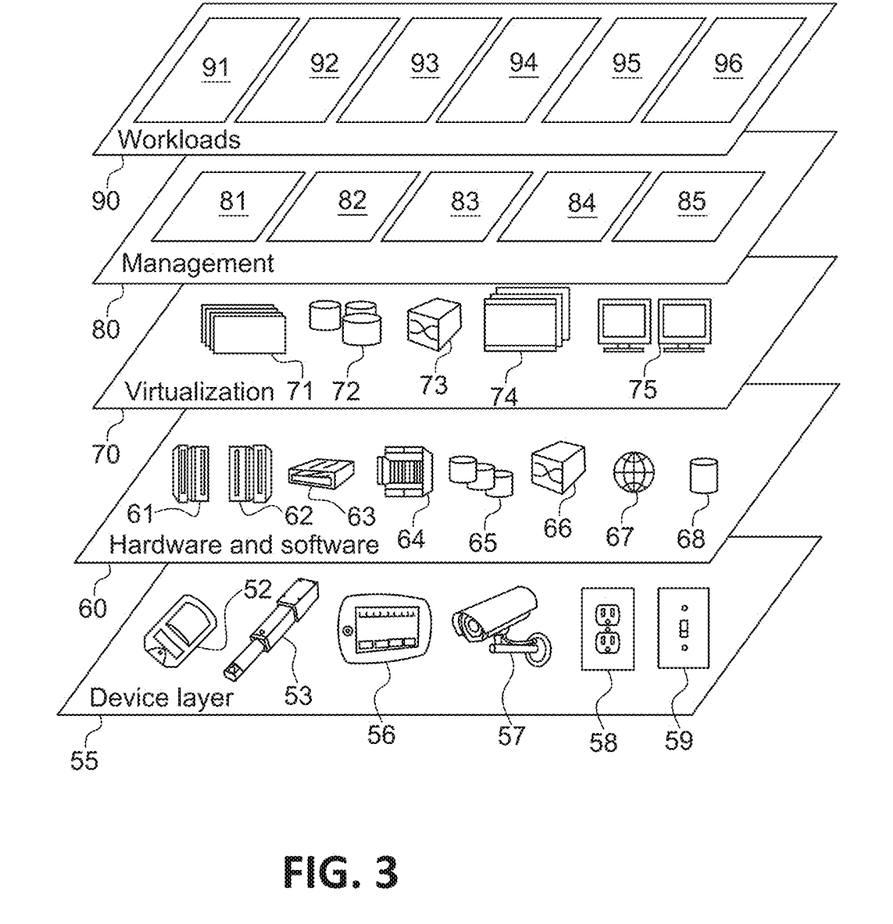
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for planning vehicular driving actions in the presence of non-recurrent events. In addition, various workloads and functions 96 for planning vehicular driving actions in the presence of non-recurrent events may include such operations as data analysis (including data collection and processing from various vehicular or environmental sensors), collaborative data analysis, and predictive data analytics functions. One of ordinary skill in the art will appreciate that the workloads and functions 96 for planning vehicular driving actions in the presence of non-recurrent events may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
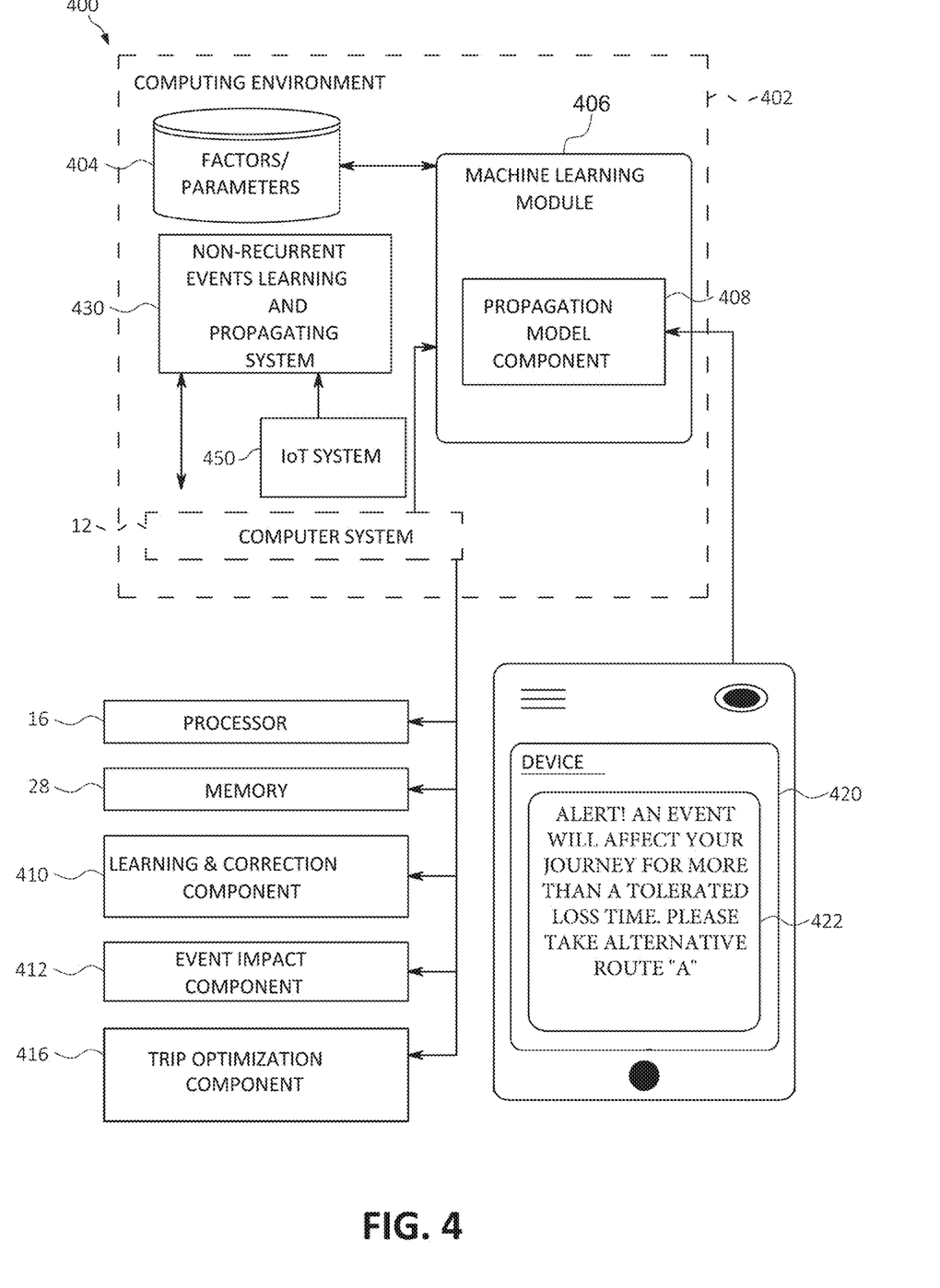
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates planning vehicular driving actions in the presence of non-recurrent events in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402, an IoT system 450 (e.g., a transport network), a non-recurrent events learning and propagating system 430, and a device 420, such as a desktop computer, laptop computer, tablet, smartphone, vehicular communication system, or on-board navigation system, and/or another electronic device that may have one or more processors and memory. The device 420, the non-recurrent events learning and propagating system 430, and the computing environment 402 may each be associated with and/or in communication with each other by one or more communication methods, such as a computing network and the IoT system 450. In one example, the device 420 and/or the non-recurrent events learning and propagating system 430 may be controlled by a user, vehicle, customer, or technician/administrator associated with the computing environment 402. In another example, the device 420 and/or the non-recurrent events learning and propagating system 430 may be completely independent from the user, vehicle, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a factors and/or parameters 404 that is associated with a machine learning module 406 and the non-recurrent events learning and propagating system 430. The features and/or parameters database 404 may also include vehicle operator profiles for each operator of a vehicle associated with the non-recurrent events learning and propagating system, and/or a knowledge domain or ontology, or factors/parameters obtained from one or more data sources in a cloud computing environment. The factors and/or parameters 404 may be a combination of factors, parameters, or characteristics of an IoT system 450 (e.g., a transport network), learned parameter data, static transport network data, location of one or more events (e.g., non-recurrent events), a degree of intensity of the one or more events that impact the transport network, one or more traffic conditions, traffic predictions, loss time of one or more users of the transport network as a result of the one or more events, a total time of driving by one or more users, predicted routes associated with the one or more users of the transport network, current routes associated with the one or more users of the transport network, traffic data, weather data, road conditions, travel itinerary of the one or more users, weather data, road conditions, and route trajectories in relation to a vehicle relating to the non-recurrent events learning and propagating system 430. That is, different combinations of parameters may be selected and applied to the input data for detecting (in real-time), learning and/or training one or more machine learning models such as, for example, using a propagation model component 408 of the machine learning module 406.

The computing environment 402 may also include a computer system 12, as depicted in FIG. 1. The computer system 12 may also include a learning and correction component 410, an event impact component 412, and a trip optimization component 416 each associated with the machine learning module 406 for training and learning one or more machine learning models and also for applying multiple combinations of the factors/parameters thereof to the machine learning model for planning vehicular driving actions in the presence of non-recurrent events.

In one aspect, the machine learning module 406 may include the propagation model component 408 for cognitively predicting and/or propagating one or more driver actions in response to one or more non-detected recurrent events.

One or more of a plurality of contextual factors may be detected and learned and used via the learning and correction component 410 in association with the factors/parameters 404 (which may be a database). The contextual factors include a static transport network, location of one or more events, duration of one or more events, a degree of intensity of the one or more events that impact the transport network, one or more traffic conditions, traffic predictions, traffic data, weather data, road conditions, or a combination thereof. The learning and correction component 410 may detect and learn the one or more vehicle-specific factors. The vehicle-specific factors may include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

That is, one or more non-recurrent events may be obtained from the IoT system 450. The learning and correction component 410 may propagate and learn the dynamics of the non-recurrent event(s) in the context of the contextual factors. That is, the learning and correction component 410 may propagate and learn dynamics of one or more non-recurrent events in a transport network according to one or more contextual factors. The learning and correction component 410 may learn one or more vehicle-specific factors in relation to a historical journey and current journey of a vehicle. The learning and correction component 410 may include defining or identifying one or more non-recurrent events of the IoT system 450 such as, for example, traffic congestion at one or more locations in the transport network, an accident, a temporary road closure, a temporary event causing a negative impact on traffic flow in the transport network, or combination thereof.

The learning and correction component 410, in association with the non-recurrent events learning and propagating system 430, may learn and identify one or more conflicts or negative impacts associated with the non-recurrent events and a current route, predicted route, and/or an anticipated route of one or more users. The event impact component 412 may intersect an impact of the one or more non-recurrent events with a selected route in the transport network for both a selected time and location. That is, the event impact component 412 may identify the impact (e.g., a negative impact) of the one or more non-recurrent events in both time and space, and also determine a degree or level of the impact of one or more non-recurrent events on one or more users/vehicles of the transport network.

The learning and correction component 410, in association with the non-recurrent events learning and propagating system 430, may then suggest one or more corrections to resolve the detected conflicts (and negative impacts) in the transport network. That is, learning and correction component 410, in association with the non-recurrent events learning and propagating system 430, may generate and/or suggest one or more action responses associated with the one or more non-recurrent events and the one or more vehicle-specific factors.

For example, the learning and correction component 410, in association with the non-recurrent events learning and propagating system 430, may propagate one or more alternative routes of the transport network for one or more users/vehicles, an advanced departure time for using the transport network, an increase or decrease in vehicular speed of one or more vehicles, a termination of movement of the one or more vehicles in the transport network, or a combination thereof.

The trip optimization component 416 may provide an optimized, transport network conflict resolution model or policy for cognitively suggesting one or more mitigating actions for each specific user and/or vehicle as the propagated corrections to resolve a conflict between a route trajectory of each user and a route having the one or more non-recurrent events in the transport network. For example, the trip optimization component 416 may suggest to user "A" an alternative route to reach a selected destination. However, a completely different alternative route may be suggested to user "B." To further illustrate, assume user A and user B are both traveling on a transport network to a similar destination. However, user A may be provided different corrective driving actions to negotiate the conflicts caused by the one or more non-recurrent events (such as taking road "X" and travel at a speed of "Y"). So as to avoid creating additional conflicts or new "non-recurrent events" on road "X" between user A and user B, the trip optimization component 416 may indicate to user B different corrective driving actions (as compared to user A) to negotiate the conflicts caused by the one or more non-recurrent events (such as taking road "Z" and travel at a speed of "Q").

The device 420 may include a graphical user interface (GUI) 422 enabled to display on the device 420 one or more user interface controls for a user to interact with the GUI 422. For example, the GUI 422 may display one or more action responses propagated to a user, via the non-recurrent events learning and propagating system 430, associated with the learned one or more non-recurrent events according to one or more contextual factors. For example, one or more action responses may indicate or display audibly and/or visually on the GUI 422 "Alert! An event will affect your journey for more than a "tolerated loss time" (5 min). Please take alternative route "A"."

In one aspect, the machine learning modeling, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata.

Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
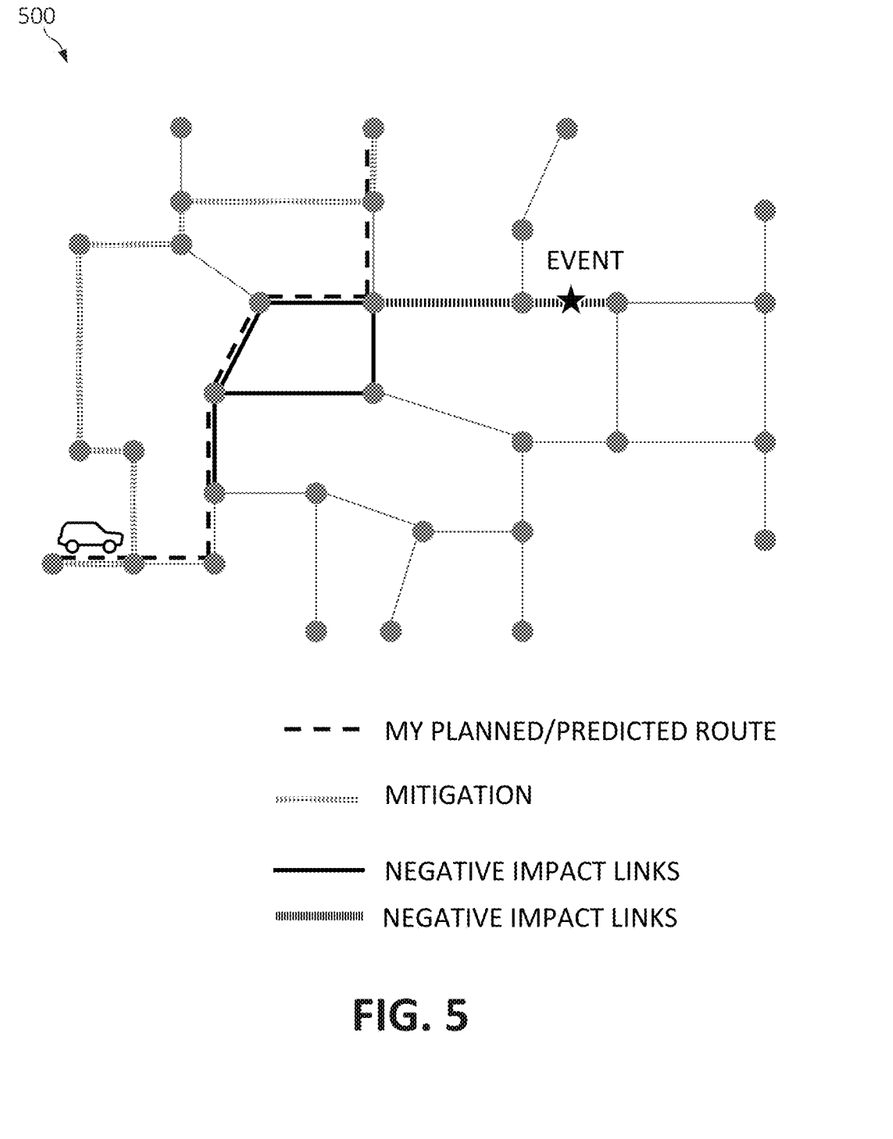
FIG. 5 is a diagram of cognitive rerouting of a vehicle in the presence of non-recurrent events in an Internet of Things (IoT) computing network in accordance with aspects of the present invention.

Turning to FIG. 5, a diagram depicts a map of cognitive rerouting of a vehicle in the presence of non-recurrent events in an Internet of Things (IoT) computing network. In one aspect, one or more of the components, modules, services, applications, and/or functions described in FIGS. 1-4 may be used in FIG. 5.

As illustrated, map 500 illustrates a planned and/or predicted travel route of a user (e.g., vehicle) in a transport network. However, a non-recurrent event or "event" (e.g., accident, traffic congestion, etc.) may be detected in the transport network. The impact upon the user may be propagated over both time and space. That is, one or more negative impacts caused by the non-recurrent event in the transport network (e.g., additional congestion that may be severe traffic congestion (e.g., no movement of any vehicles) or less severe traffic congestion (e.g., limited movement of the vehicles such as movement or speed being reduced below a speed limit) in relation to each other) on the planned and/or predicted travel route may be propagated to one or more users at selected time periods. Also, the quality and quantity of the impact may be determined on the planned and/or predicted travel route. Thus, a mitigating action (e.g., an alternative route or "mitigation") may be determined in response to the non-recurrent event and propagated to the user.

Figure 6:
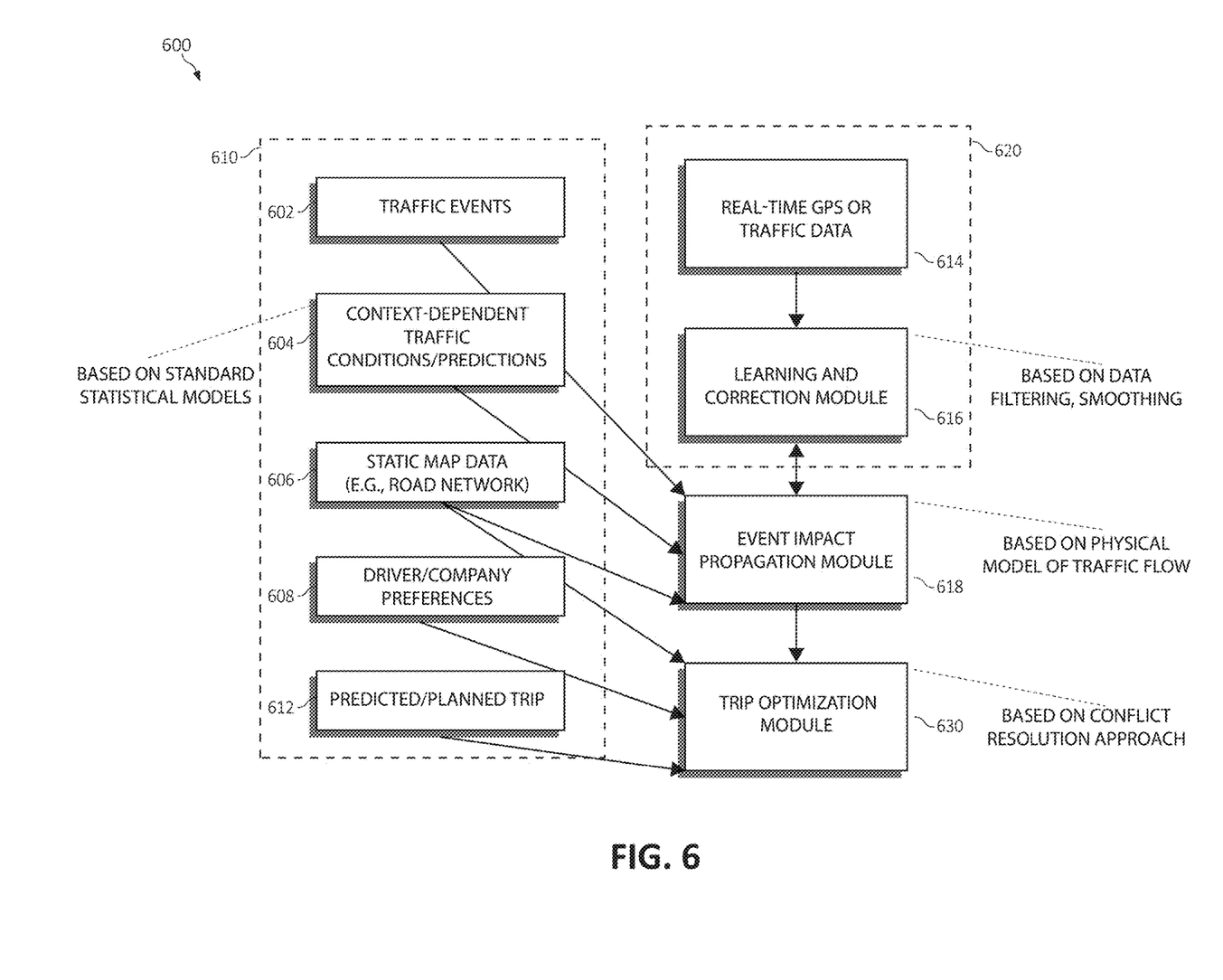
FIG. 6 is a block/flow diagram depicting planning vehicular driving actions in the presence of non-recurrent events in accordance with aspects of the present invention.

FIG. 6 is a block/flow diagram 600 depicting planning vehicular driving actions in the presence of non-recurrent events. In one aspect, one or more of the components, modules, services, applications, and/or functions described in FIGS. 1-5 may be used in FIG. 6. For example, computer system/server 12 of FIG. 1 may be included in FIG. 6 and may be connected to other computing nodes (such as computer systems of vehicles or non-vehicle systems such as traffic cameras, cloud computing networks, GPS devices, smartphones, etc.) over a distributed computing network, where additional data collection, processing, analytics, and other functionality may be realized.

As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIGS. 1-4. With the foregoing in mind, the module blocks 600 may also be incorporated into various hardware and software components of a system for planning vehicular driving actions in the presence of non-recurrent events in accordance with the present invention. Many of the functional blocks 600 may execute as background processes on various components, either in distributed computing components, or on the user device, or elsewhere, and generally unaware to the user performing generalized tasks.

Starting with block 610, one or more traffic events 602, context-dependent traffic conditions and/or predictions 604 (which may be based on selected or standardized statistical models), and/or static map data 606 (e.g., a road network) may be provided to an event impact propagation module 618.

Optionally, at block 620, real-time GPS data of one or more vehicles and/or traffic data 614 may be provided to a learning and correction module 616. The learning and correction module 616 may be based on a data filtering and data smoothing operation for online (and offline) state and parameter estimation. Thus, the input traffic measurement data (e.g., real-time GPS data of one or more vehicles and/or traffic data 614 may be smoothed and/or filtered to produce smoothed and/or filtered model parameters (e.g., link capacities which are the maximum number of vehicles that can go through the link in a selected time period (e.g., an hour), turn ratios which are a percentage of turning movements at traffic intersections) and states (densities, speeds, or flows). Examples of methods to filter/smooth components are particle filters and particle smoothers, minimax filters, Ensemble Kalman filters, etc.

The event impact propagation module 618 may use the input data from block 610, and/or optionally from block 620, to detect and/or determine an impact of one or more non-recurrent events that may be intersected with a selected route in the transport network for both a selected time and location. The event impact propagation module 618 may be based on a physical model of traffic flow. The physical model may be cell-transmission model or link transmission model which are based on a traffic flow model (e.g., LWR model (PDE)). In one aspect, the cell-transmission model is a numerical method for solving the LWR model at a cell level, and the link-transmission model is a numerical method for solving the LWR model at a link level, where a link defines the connection between two intersections. The LWR model is the Lighthill Whitham Richards model, which is a macroscopic model of traffic flow, and provides an equilibrium empirical relation between the flow, density and speed in addition to the conservation law written as a partial differential equation of the flow and density.

In short, the learning and correction module 616 may directly interact with a propagation model such as, for example, the event impact propagation module 618. The event impact propagation module 618 may predict one or more traffic conditions with the predicted traffic conditions being corrected with available real-time traffic data/measurements using a selected smoothing or filtering operation. In one aspect, event impact propagation module 618 may solve one or more partial differential equations to predict the one or more traffic conditions.

The event impact propagation model from block 618 and static map data 606 (e.g., road network map), preferences of one or more users and/or drivers/companies 608, and a predicted and/or planned trip 612, from block 610, may be fed into a trip optimization module, at block 630. The trip optimization module (e.g., the trip optimization component 416 of FIG. 4) may provide a traffic conflict resolution model. The trip optimization module may provide a traffic conflict resolution model to provide conflict resolution between a route trajectory and a trajectory of one or more recurrent events. That is, the traffic conflict resolution model may cognitively suggest one or more mitigating actions for each specific user and/or vehicle as the propagated corrections to resolve a conflict between a route trajectory of each user and a route having the one or more non-recurrent events in the transport network. The trip optimization module, as block 630, may also rely on solving more classic (stochastic) time-dependent shortest path problems ("STDSP" or "TDSP").

Figure 7:
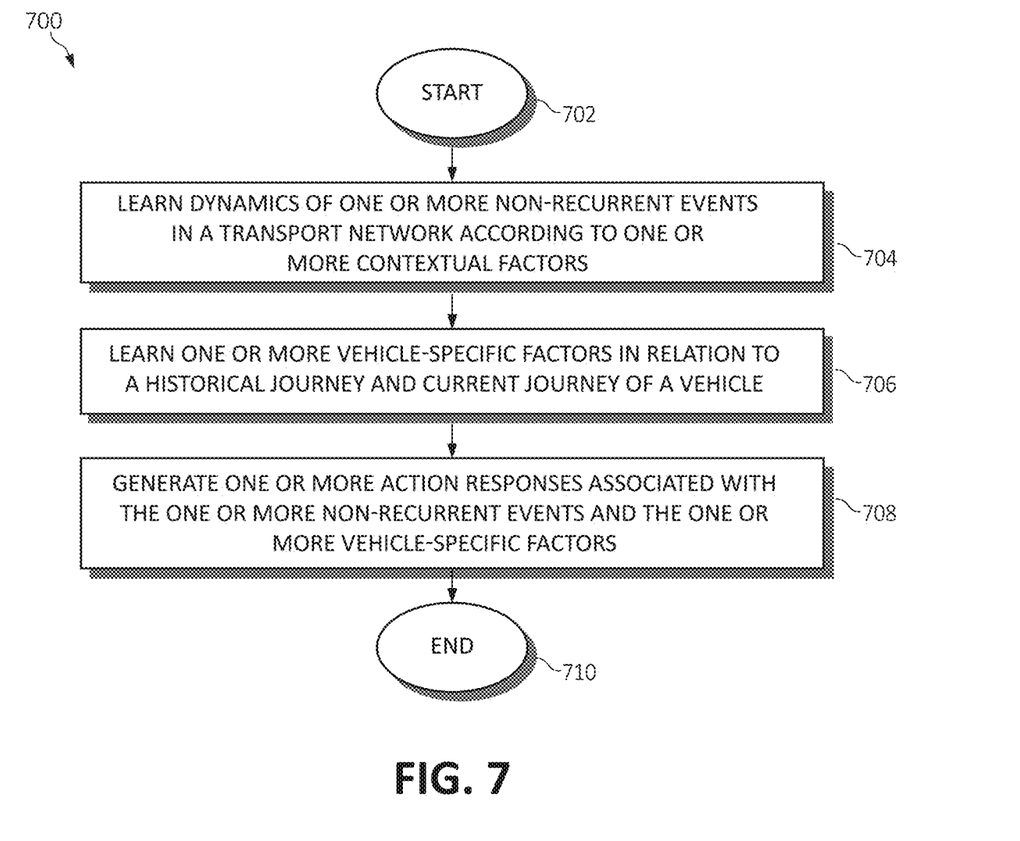
FIG. 7 is a flowchart diagram of an exemplary method for planning vehicular driving actions in the presence of non-recurrent events by a processor, in which various aspects of the present invention may be realized.

Turning now to FIG. 7, a method 700 for planning vehicular driving actions in the presence of non-recurrent events by a processor is depicted, in which various aspects of the illustrated embodiments may be implemented. The functionality 700 may start in block 702. One or more dynamics of non-recurrent events in a transport network may be learned according to one or more contextual factors, as in block 704. One or more vehicle-specific factors may be learned in relation to a historical journey and current journey of a vehicle, as in block 706. One or more action responses associated with the one or more non-recurrent events and the one or more vehicle-specific factors may be generated, as in block 708. The functionality 700 may end, as in block 710.

Figure 8:
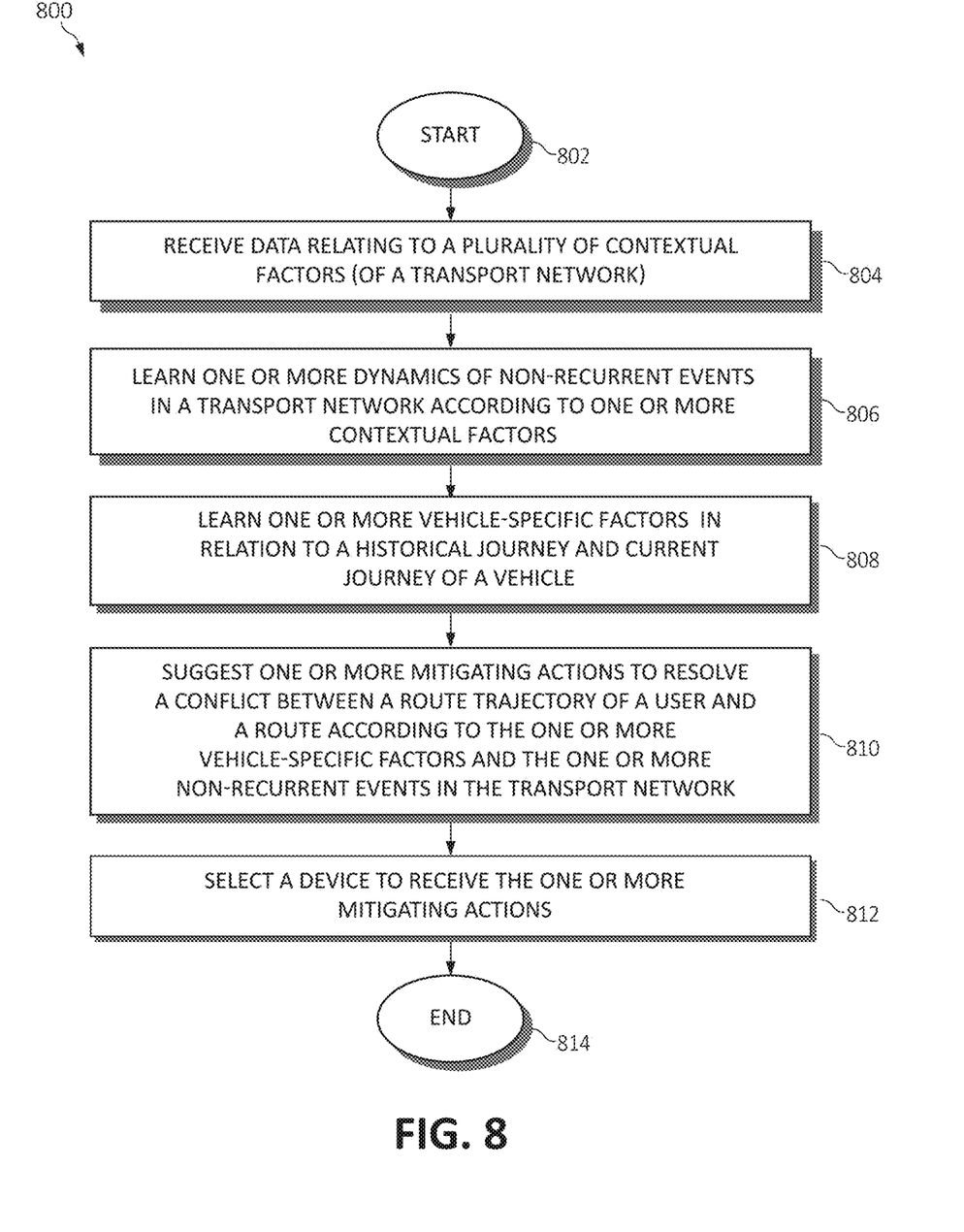
FIG. 8 is a flowchart diagram of an additional exemplary method for planning vehicular driving actions in the presence of non-recurrent events by a processor, in which various aspects of the present invention may be realized.

Turning now to FIG. 8, a method 800 for planning vehicular driving actions in the presence of non-recurrent events by a processor is depicted, in which various aspects of the illustrated embodiments may be implemented. The functionality 800 may start in block 802. Data relating to a plurality of contextual factors (of a transport network) may be received, as in block 804. One or more dynamics of non-recurrent events in a transport network may be learned according to one or more contextual factors, as in block 806. One or more vehicle-specific factors may be learned in relation to a historical journey and current journey of a vehicle, as in block 808. One or more mitigating actions may be suggested to resolve a conflict between a route trajectory of a user and a route according to the one or more vehicle-specific factors and the one or more non-recurrent events in the transport network, as in block 810. A device (e.g., a device type) may be selected to receive the one or more mitigating actions, as in block 812. The functionality 800 may end, as in block 814.

In one aspect, in conjunction with and/or as part of at least one block of FIGS. 7-8, the operations of 700 and/or 800 may include each of the following. The operations of 700 and/or 800 may detect and learn the one or more contextual factors. The contextual factors include a static transport network, location of one or more events, duration of one or more events, a degree of intensity of the one or more events that impact the transport network, one or more traffic conditions, traffic predictions, traffic data, weather data, road conditions, or a combination thereof. The operations of 700 and/or 800 may detect and learn the one or more vehicle-specific factors. The vehicle-specific factors include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

One or more non-recurrent events may be defined as traffic congestion at one or more locations in the transport network, an accident, a temporary road closure, a temporary event causing a negative impact on traffic flow in the transport network, or combination thereof.

The operations of 700 and/or 800 may suggest one or more alternative routes of the transport network, an advanced departure time for using the transport network, an increase or decrease in vehicular speed of one or more vehicles, a stopover (e.g., a layover) or termination of movement of the one or more vehicles in the transport network, an additional stopover at a location of interest to the vehicle, a change of transport mode, or a combination thereof. The learned dynamics of one or more non-recurrent events in the transport network may be propagated according to one or more contextual factors.

The operations of 700 and/or 800 may intersect an impact of the one or more non-recurrent events with a selected vehicle route in the transport network for both a selected time and location. Also, the operations of 700 and/or 800 may select one or more mitigating actions as the one or more action responses to resolve a conflict between a route trajectory of a user and a route having the one or more non-recurrent events in the transport network, select a device to receive the one or more mitigating actions, wherein the device is an Internet of Things (IoT) device, and/or select a balanced driving action among the one or more mitigating actions for one or more users to avoid deteriorating the traffic conditions upon resolving a conflict of the one or more non-recurrent events for a plurality of users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for planning vehicular driving actions in the presence of non-recurrent events, comprising:
    learning dynamics of one or more non-recurrent events in a transport network according to one or more contextual factors, wherein learning the dynamics includes intersecting an impact of the one or more non-recurrent events with a selected vehicle route in the transport network for both a selected time and location;
    learning one or more vehicle-specific factors in relation to a historical journey and current journey of a vehicle; and
    generating one or more action responses associated with the one or more non-recurrent events and the one or more vehicle-specific factors.

2. The method of claim 1, further including:
    detecting and learning the one or more contextual factors, wherein the one or more contextual factors include a static transport network, location of one or more events, duration of one or more events, a degree of intensity of the one or more events that impact the transport network, one or more traffic conditions, traffic predictions, traffic data, weather data, road conditions, or a combination thereof; and
    detecting and learning the one or more vehicle-specific factors, wherein the one or more vehicle-specific factors include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

3. The method of claim 1, further including defining the one or more non-recurrent events as traffic congestion at one or more locations in the transport network, an accident, a temporary road closure, a temporary event causing a negative impact on traffic flow in the transport network, or combination thereof.

4. The method of claim 1, further including suggesting one or more alternative routes of the transport network, an advanced departure time for using the transport network, an increase or decrease in vehicular speed of one or more vehicles, a stopover or termination of movement of the one or more vehicles in the transport network, an additional stopover at a location of interest to the vehicle, a change of transport mode, or a combination thereof.

5. The method of claim 1, further including propagating the learned dynamics of one or more non-recurrent events in the transport network according to one or more contextual factors.

6. The method of claim 1, further including:
    selecting one or more mitigating actions as the one or more action responses to resolve a conflict between a route trajectory of a user and a route having the one or more non-recurrent events in the transport network;
    selecting a device to receive the one or more mitigating actions, wherein the device is an Internet of Things (IoT) device; or
    selecting a balanced driving action among the one or more mitigating actions for one or more users to avoid deteriorating the traffic conditions upon resolving a conflict of the one or more non-recurrent events for a plurality of users.

7. A system for planning vehicular driving actions in the presence of non-recurrent events, comprising:
    one or more computers with executable instructions that when executed cause the system to:
        learn dynamics of one or more non-recurrent events in a transport network according to one or more contextual factors, wherein learning the dynamics includes intersecting an impact of the one or more non-recurrent events with a selected vehicle route in the transport network for both a selected time and location;
        learn one or more vehicle-specific factors in relation to a historical journey and current journey of a vehicle; and
        generate one or more action responses associated with the one or more non-recurrent events and the one or more vehicle-specific factors.

8. The system of claim 7, wherein the executable instructions further:
    detect and learn the one or more contextual factors, wherein the one or more contextual factors include a static transport network, location of one or more events, duration of one or more events, a degree of intensity of the one or more events that impact the transport network, one or more traffic conditions, traffic predictions, traffic data, weather data, road conditions, or a combination thereof; and
    detect and learn the one or more vehicle-specific factors, wherein the one or more vehicle-specific factors include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

9. The system of claim 7, wherein the executable instructions further define the one or more non-recurrent events as traffic congestion at one or more locations in the transport network, an accident, a temporary road closure, a temporary event causing a negative impact on traffic flow in the transport network, or combination thereof.

10. The system of claim 7, wherein the executable instructions further suggest one or more alternative routes of the transport network, an advanced departure time for using the transport network, an increase or decrease in vehicular speed of one or more vehicles, a stopover or termination of movement of the one or more vehicles in the transport network, an additional stopover at a location of interest to the vehicle, a change of transport mode, or a combination thereof.

11. The system of claim 7, wherein the executable instructions further propagate the learned dynamics of one or more non-recurrent events in the transport network according to one or more contextual factors.

12. The system of claim 7, wherein the executable instructions further:
- select one or more mitigating actions as the one or more action responses to resolve a conflict between a route trajectory of a user and a route having the one or more non-recurrent events in the transport network;
- select a device to receive the one or more mitigating actions, wherein the device is an Internet of Things (IoT) device; or
- select a balanced driving action among the one or more mitigating actions for one or more users to avoid deteriorating the traffic conditions upon resolving a conflict of the one or more non-recurrent events for a plurality of users.

13. A computer program product for planning vehicular driving actions in the presence of non-recurrent events by a processor, the computer program product comprising a non-transitory computer-readable storage medium having computer-readable program code portions stored therein, the computer-readable program code portions comprising:
- an executable portion that learns dynamics of one or more non-recurrent events in a transport network according to one or more contextual factors, wherein learning the dynamics includes intersecting an impact of the one or more non-recurrent events with a selected vehicle route in the transport network for both a selected time and location;
- an executable portion that learns one or more vehicle-specific factors in relation to a historical journey and current journey of a vehicle; and
- an executable portion that generates one or more action responses associated with the one or more non-recurrent events and the one or more vehicle-specific factors.

14. The computer program product of claim 13, further including an executable portion that:
- detects and learns the one or more contextual factors, wherein the one or more contextual factors include a static transport network, location of one or more events, duration of one or more events, a degree of intensity of the one or more events that impact the transport network, one or more traffic conditions, traffic predictions, traffic data, weather data, road conditions, or a combination thereof; and
- detects and learns the one or more vehicle-specific factors, wherein the one or more vehicle-specific factors include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

15. The computer program product of claim 13, further including an executable portion that:
- defines the one or more non-recurrent events as traffic congestion at one or more locations in the transport network, an accident, a temporary road closure, a temporary event causing a negative impact on traffic flow in the transport network, or combination thereof; and
- suggests one or more alternative routes of the transport network, an advanced departure time for using the transport network, an increase or decrease in vehicular speed of one or more vehicles, a stopover or termination of movement of the one or more vehicles in the transport network, an additional stopover at a location of interest to the vehicle, a change of transport mode, or a combination thereof.

16. The computer program product of claim 13, further including an executable portion that propagates the learned dynamics of one or more non-recurrent events in the transport network according to one or more contextual factors.

17. The computer program product of claim 13, further including an executable portion that:
- selects one or more mitigating actions as the one or more action responses to resolve a conflict between a route trajectory of a user and a route having the one or more non-recurrent events in the transport network;
- selects a device to receive the one or more mitigating actions, wherein the device is an Internet of Things (IoT) device; or
- selects a balanced driving action among the one or more mitigating actions for one or more users to avoid deteriorating the traffic conditions upon resolving a conflict of the one or more non-recurrent events for a plurality of users.

* * * * *